United States Patent [19]
Payton

[11] Patent Number: 5,903,684
[45] Date of Patent: May 11, 1999

[54] INDEPENDENT CONTROL OF ONE OF NORMALLY INTERDEPENDENT LIGHT TRANSMISSION CHARACTERISTICS OF OPTICAL FIBER

[75] Inventor: Robert M. Payton, Portsmouth, R.I.

[73] Assignee: The United States of America as represented by the Secretary of the Navy, Washington, D.C.

[21] Appl. No.: 08/910,047

[22] Filed: Aug. 12, 1997

[51] Int. Cl.[6] .................................................. G02B 6/10
[52] U.S. Cl. ................. 385/11; 385/1; 385/147
[58] Field of Search ............... 385/1, 2, 11, 13, 385/24, 27, 147; 250/227.17, 227.18, 227.23

[56] References Cited

U.S. PATENT DOCUMENTS

| | | | |
|---|---|---|---|
| 4,753,507 | 6/1988 | DePaula et al. | 350/96.15 |
| 4,768,851 | 9/1988 | Shaw et al. | 350/96.15 |
| 5,191,387 | 3/1993 | Ichikawa et al. | 356/34 |
| 5,245,400 | 9/1993 | AnJan et al. | 356/73.1 |
| 5,561,726 | 10/1996 | Yao | 385/11 |

*Primary Examiner*—Hung N. Ngo
*Attorney, Agent, or Firm*—Michael J. McGowan; Prithvi C. Lall; Michael F. Oglo

[57] ABSTRACT

A method and apparatus for controlling polarization, as one of a pair of interdependent light characteristics of an optical fiber, in response to a time dependent signal without the introduction of any significant variation in phase delay. A pair of transducers compress the optical fiber at spaced locations. When phase of energization of a first transducer in response to the time dependent signal is 180° out-of-phase with the energization of the second transducer, the polarization shifts in response to the time dependent signal without any significant shift is phase delay. When the phases are in-phase, phase delay shifts in response to the time dependent signal without any significant shift in polarization. Multiple sets of transducers disposed along the optical fiber enable smooth variation of the controlled polarization or phase delay when a first transducer in each set is angularly displaced about the optical fiber by 45° with respect to a first transducer in an adjacent set.

25 Claims, 4 Drawing Sheets

INDEPENDENT CONTROL OF ONE OF NORMALLY INTERDEPENDENT LIGHT TRANSMISSION CHARACTERISTICS OF OPTICAL FIBER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

This patent is generally related to the control of normally interdependent light transmission characteristics, such as polarization and phase delay in an optical fiber, and more specifically to the control of one of those characteristics essentially independently of the other.

(2) Description of the Prior Art

It is well known that, in many applications involving the transmission of light through an optical fiber, the control of various light transmission characteristics can be important. For example, polarization controllers provide a means for transforming light of an arbitrary polarization to light of constant polarization. Generally these systems deform plural areas of the optical fiber to produce controlled birefringence. A number of references disclose such systems generally for controlling polarization.

U.S. Pat. No. 3,625,589 (1971) to Snitzer discloses apparatus for controlling the propagation characteristics of coherent light within an optical fiber by applying a mechanical stress to at least a section of the optical fiber. The stress varies in accordance with a signal thereby varying a characteristic of coherent light as coherent light propagates through the section. The section is arranged so that the amount of light energy from the source guided by the section from one end to the other throughout the entire length of the section is substantially constant as the mechanical stress varies.

U.S. Pat. No. 4,341,442 (1982) to Johnson discloses a fiber optical transmission filter with a double-refraction element for controlling phase delay. A manufacturing process is disclosed to provide a desired phase delay by introducing a filter with at least one double-refraction element comprising a single-mode optical filter mounted between polarizers. The double-refraction of the optical fiber is sufficiently weak so that the wavelength, within which light beams propagating with orthogonal polarization states in the fiber are mutually delayed by $2\pi$, is at least 1 cm. In one embodiment the optical fiber comprises alternating sections which produce linear double-refraction with sections which produce elliptical double-refraction.

U.S. Pat. No. 4,729,622 (1988) to Pavlath discloses a fiber optic polarizer that converts a light wave of an arbitrary polarization propagating in a single mode optical fiber into a wave having a single linear polarization state. The polarization controller couples light of an undesired polarization out of the fiber. A photo detector produces an error signal responsive to light coupled from the fiber. Control circuitry processes the error signal to produce control signals which are input to the polarizer to null the error signal. With the error signal maintained at a minimum value, the light input to the polarizer and, hence, the light output therefrom is a wave having only the desired linear polarization.

U.S. Pat. No. 4,753,507 (1988) to DePaula et al. discloses a piezoelectric load housing and method that includes a fiber squeezer with a frame that applies a preload to an optical fiber to permit variation of birefringence. An appropriate voltage source is connected to a piezoelectric transducer to control the force on the fiber thereby to control the refractive indices of the fiber by means of the photo-elastic effect. The relative positions of legs in the fiber squeezer are adjustable during assembly of the frame to permit application of a preload to the fiber and transducer fiber squeezer.

U.S. Pat. Nos. 4,768,851 (1988) and 4,792,207 (1988) and 4,801,189 (1989) to Shaw et al. disclose various fiber optic coupler embodiments. In each embodiment the coupler comprises a single continuous strand of optical fiber and a device for applying stress to the optical fiber at spaced intervals along the fiber. The stress deforms the fiber and abruptly changes the fiber geometry at the beginning and end of each stressed region. The change in fiber geometry causes coupling of light from the fundamental mode to the second order mode. The coupler, under certain conditions, exhibits polarization dependence, and thus, it may be utilized as a fiber optic polarizer. In addition, the device couples coherently, and may be used as an interferometric system. In the Shaw-207 patent, the waveguides are characterized by two modes of propagation in one fiber. Plural distributed coupling ridges or electrodes mounted adjacent piezoelectric materials are independently driven to apply sinusoidally varying sources to the fiber. In this embodiment the input signal is acoustic energy. In the Shaw-189 patent, a highly birefringent fiber optic waveguide is positioned on a flat polished surface with either of the principal axes of birefringence oriented at an angle, preferably 45°, to the vertical. A ridged block is then pressed down on the fiber. The ridges have longitudinal axes transverse to the longitudinal axes of the fiber. The width of the ridge faces is one-half beat length and the spacing between the ridges is also one-half beat length. The stressed regions caused by the ridges produce coupling of light traveling in one polarization mode into the other polarization mode by abrupt shifting of the axes of birefringence at the boundaries of the stressed regions.

U.S. Pat. No. 4,781,425 (1988) to Risk et al. discloses an acoustic-optic frequency shifter having a long interaction region for optical analysis. A variable frequency signal generator drives an acoustic transducer to launch an acoustic wave in contact with the optical fiber. The acoustic frequency is varied over a known range to generate acoustic waves having known wavelengths. An optical signal having an unknown optical wavelength is introduced into one end of the optical fiber in a first polarization mode. The effect of the acoustic wave on the optical signal is to cause coupling of the optical signal with the first polarization mode to a second orthogonal polarization mode. The amount of coupling is dependent on the phase-matching between an acoustic wavelength and an optical beat length. The coupling between the polarization modes is maximum when the acoustic wavelength is equal to the optical beat length. The intensity of the optical signal coupled to the second polarization mode can be measured to determine the optical wavelength corresponding to the acoustic wavelength when the maximum intensity occurs.

U.S. Pat. No. 4,793,676 (1988) to Risk discloses a fiber optic amplitude modulator that couples light between two orthogonal polarization modes of a birefringent fiber. Dynamic coupling is caused by applying synchronized acoustic surface waves to the birefringent fiber in a direction normal to the fiber axis. A static biasing force is applied across the fiber to statically couple 50% of the light input to one polarization mode into another polarization mode. The additional force caused by the acoustic waves causes the fraction of coupled power to vary about the coupling caused by the static force.

U.S. Pat. No. 4,988,169 (1991) to Walker discloses an optical signal control method and apparatus. Four birefringent elements in series are arranged to rotate the state of polarization alternately about orthogonal axes on a Poincare sphere. A controller enables time varying initial and final polarization states to be tracked. It also ensures that the birefringence limits of the elements are never reached by carrying out an adjustment procedure. A reduction by a full revolution for one element can be achieved by varying the transformations of the other elements.

U.S. Pat. No. 5,004,312 (1991) to Shimizu discloses a method for controlling the polarization of light by generating first through fifth birefringences in series along a light propagating medium. The first to fifth birefringences have main axes of 0°, 45°, 0°, 45° and 0° relative to an arbitrary direction orthogonal to a light propagating direction of the medium. The magnitude of the birefringences are changed to change the first to fifth phase differences. In an ordinary polarization control, the second to fourth phase differences are changed. However, one or both of the first and fifth phase differences are changed in a resetting operation for one of the second to fourth phase differences. Consequently, the phase differences are reset without the dependency on polarizations of input light supplied to a polarization controller and output light supplied from the polarization controller.

Collectively the foregoing patents disclose various methods of applying stresses to optical fibers to influence various characteristics. Typically the characteristics are polarization and/or delay. However, these patents also depict the characteristics of polarization and delay as being normally interdependent. That is, varying polarization produces significant delay variations, and, conversely, varying delay changes polarization significantly. The application of a force in this manner produces a non-zero birefringence and a non-zero average phase change. If such a polarization controller is used to control polarization in a fiber optic phase sensor system, the non-zero average phase change introduces unwanted phase noise. Conversely if a phase controller using such forces is applied to a polarization sensitive fiber optic sensor system, the non-zero birefringence change introduces an unwanted polarization noise. None of the references seems to disclose the control of one such normally interdependent light transmission characteristic essentially independently of the other. More specifically, none of the references discloses any procedure for varying either polarization or phase delay without incurring a significant change in the other.

SUMMARY OF THE INVENTION

Therefore it is an object of this invention to provide a method and apparatus for enabling the control of one of two normally interdependent characteristics of light in an optical fiber independently of the other characteristic.

It is another object of this invention to provide a method and apparatus for enabling the control of light polarization in an optical fiber essentially independently of changes in phase delay.

It is yet another object of this invention to provide a method and apparatus for enabling the control of phase delay in an optical fiber essentially independently of changes in polarization.

In accordance with this invention, first and second locations are defined along the length of an optical fiber for compressing the optical fiber under the influence of first and second pairs of opposed forces. Forces are directed in a pair along a force axis, the force axes at the first and second locations being in parallel planes orthogonal to the optical fiber axis and being angularly displaced. A constant phase relationship is maintained between the forces at the first and second locations and the time dependent signal whereby variations in the forces applied at the first and second locations alter the one interdependent characteristic of light passing the first and second locations in accordance with the time dependent signal without any significant variation in the other characteristic.

In accordance with another aspect of this invention, control over the polarization of light in an optical fiber in response to a time dependent variable signal without any significant variation in the normally interdependent characteristic of phase delay is achieved. First and second locations are defined along the length of an optical fiber for compressing the optical fiber under the influence of first and second pairs of opposed forces. The forces are directed in a pair along a force axis, the force axes at the first and second locations being in parallel planes orthogonal to the optical fiber axis and being angularly displaced. An out-of phase relationship is maintained between the forces at the first and second locations and the time dependent signal whereby variations in the forces applied at the first and second locations alter the polarization of light passing the first and second locations in accordance with the time dependent signal without introducing any significant variation in phase delay.

In accordance with another aspect of this invention, control over the phase delay of light in an optical fiber in response to a time dependent variable signal without any significant variation in the normally interdependent characteristic of polarization is achieved. First and second locations are defined along the length of an optical fiber for compressing the optical fiber under the influence of first and second pairs of opposed forces. The forces are directed in a pair along a force axis, the force axes at the first and second locations being in parallel planes orthogonal to the optical fiber axis and being angularly displaced. An in phase relationship is maintained between the forces at the first and second locations and the time dependent signal whereby variations in the forces applied at the first and second locations alter the phase delay of light passing the first and second locations in accordance with the time dependent signal without introducing any significant variation in polarization.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
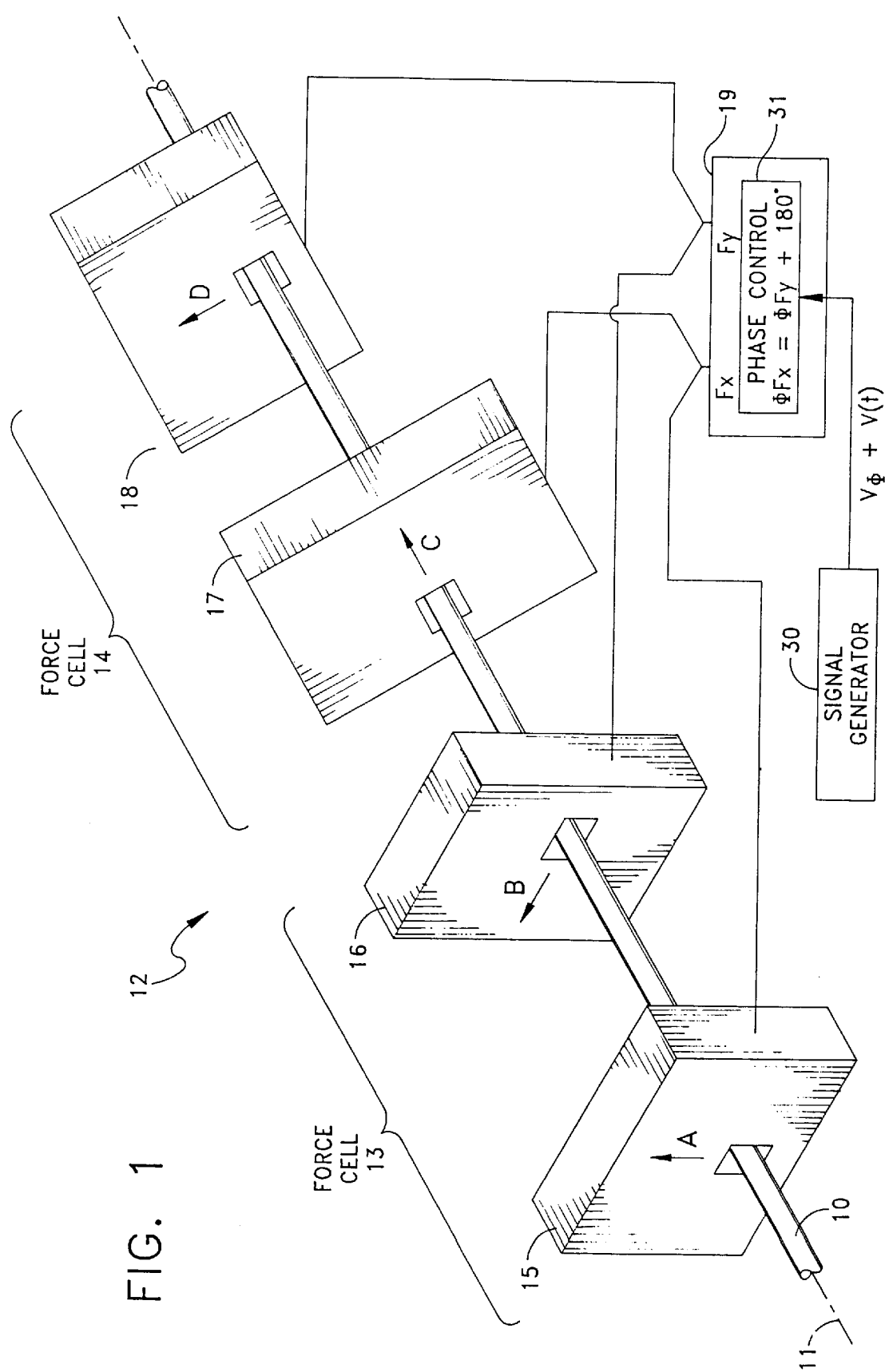
FIG. 1 is a perspective view of a controller for varying the polarization of light transmitted through an optical fiber in accordance with this invention.

FIG. 1 depicts an optical fiber 10 extending along an axis 11 through a light transmission characteristic controller 12 constructed in accordance with this invention. The controller 12 contains a first force cell 13 and a second force cell 14 at a plurality of spaced positions along the length of the optical fiber 10 as described more fully later. In this embodiment, the force cell 13 includes a transducer 15 and a transducer 16 at a pair of spaced locations along the optical fiber 10 and displaced angularly by 90° about the axis of the optical fiber. For purposes of discussion, an orientation arrow A marks transducer 15 and is vertical. A corresponding orientation arrow B on the transducer 16 indicates that the transducer 16 is rotated 90° counterclockwise looking from left to right along the optical fiber 10 in FIG. 1.

Similarly the force cell 14 comprises a transducer 17 with an orientation arrow C and a transducer 18 with an orientation arrow D. In the force cell 14, the transducer 18 is rotated 90° counterclockwise with respect to the transducer 17. In addition, the force cell 14 is rotated 45° clockwise with respect to the force cell 13. That is, in FIG. 1 the orientation arrow C on the transducer 17 is rotated 45° clockwise with respect to the orientation arrow A on the transducer 15 looking from left to right.

A controller 19 connects to each of the transducers 15 through 18 and controls the application of force by each in a sequence as described more fully later. As will be shown, if the controller 19 applies the forces to the transducers 15 and 16 with a 180° phase shift; that is $\Phi(F_x)=\Phi(F_y)+180°$ to control the polarization of the light passing through the force cell 13 in a predictable manner without the introduction of any significant change in phase delay. Conversely, if the controller 19 energizes the transducer 15 and 16 with no phase shift (i.e., $\Phi(F_x)=\Phi(F_y)$), the phase delay of light passing through the force cell 13 will change in a predictable manner without the introduction of any significant change in polarization.

As known, when a force cell or transducer, such as either force cell 13 or 14, stresses the optical fiber 10 by compression, the index of refraction inside the optical fiber alters at each site of the force application. The change in the index of refraction causes birefringence. Birefringence is the phase difference per unit length between light propagating with a polarization oriented along a fast axis and light propagating with a polarization oriented about a slow axis. When an optical fiber is pressed between two plates the birefringence increases linearly with the applied force. However, the applied force also changes the optical path length and produces a phase change. Moreover, the speed of light inside the fiber is dependent upon the optical polarization state. Light entering at one polarization will travel at a different speed than light entering at another polarization.

Figure 2:
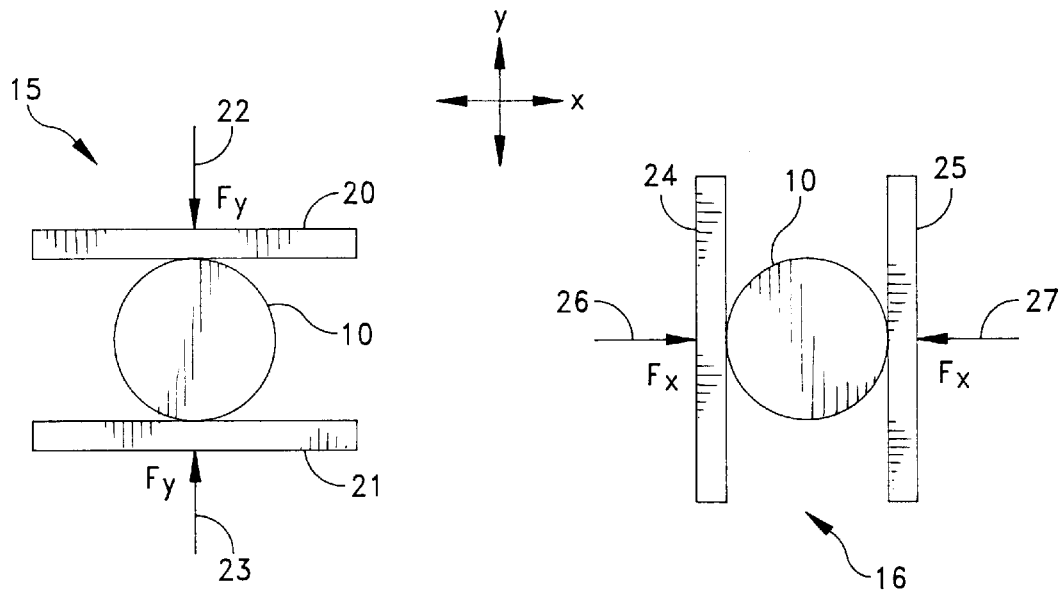
FIG. 2 is a diagram that shows the forces applied in a force cell of FIG. 1.

Looking first at FIG. 2 and at the general physics of an optical fiber 10 and assuming that "y" is the fast axis and "x" is the slow axis, $$\beta = \Phi_y - \Phi_x \quad (1)$$

where "$\beta$" is the resultant phase change through the birefringence and "$\Phi_y$" and "$\Phi_x$" are the phase changes introduced by a force applied to the fiber 10 along the fast axis and slow axis respectively. Given this relationship the average phase change "$\overline{\Phi}$" is $$\overline{\Phi} = \frac{(\Phi_y + \Phi_x)}{2} \quad (2)$$

Figure 3:
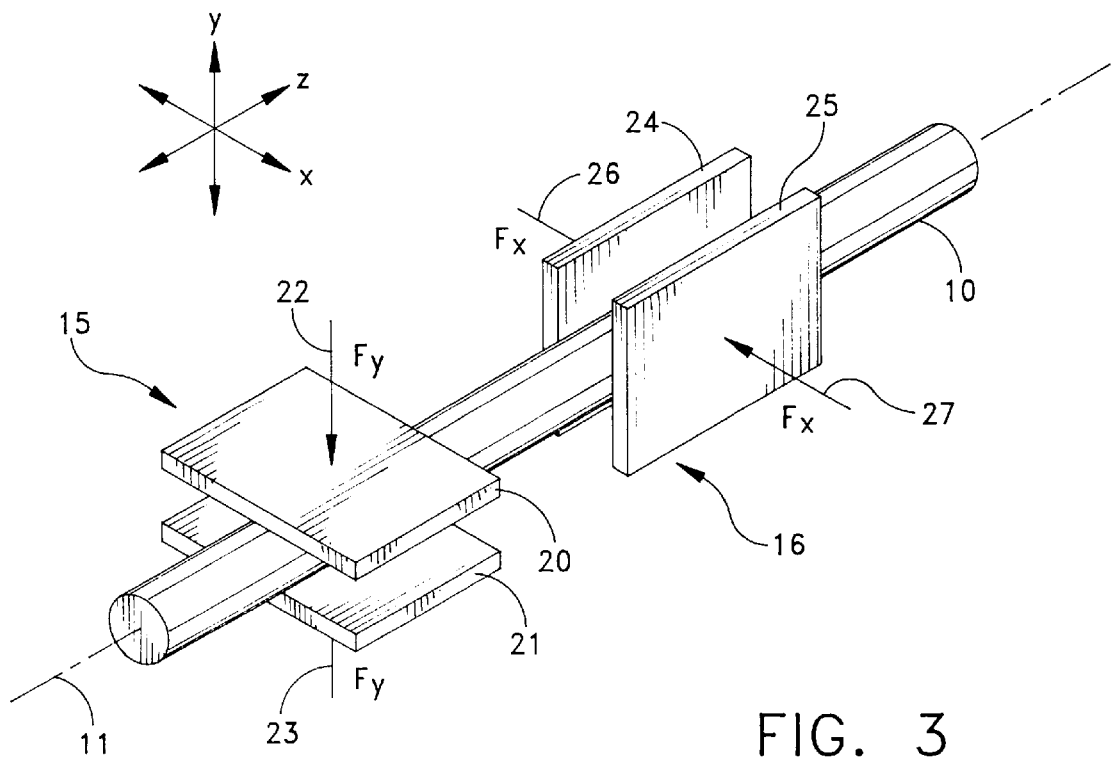
FIG. 3 schematically depicts the superposition of forces in a force cell of FIG. 1.

In accordance with this invention and as shown in FIG. 1 the transducers 15 and 16 form force cell 13 and the transducers 17 and 18 form force cell 14. FIGS. 2 and 3 depict one such force cell in a schematic form that will facilitate an understanding of this invention. More specifically, in this embodiment the transducer 15 is represented as including an upper horizontal plate 20 and a lower horizontal plate 21. Arrows 22 and 23 represent forces $F_y$ that compress the optical fiber 10 and produce birefringence. Likewise, the element 16 includes vertical plates 24 and 25. Arrows 26 and 27 depict $F_x$ forces applied in a horizontal direction i.e., along an axis that is displaced 90° from the direction of the forces or axes defined by lines 22 and 23.

When the force $F_x$ is applied to the plates 24 and 25, the optical fiber 10 compresses and produces another region of birefringence. Thus, as coherent light enters the optical fiber 10, it propagates through the region of the optical fiber 10 being squeezed by plates 20 and 21, continues down the optical fiber 10 and propagates through the region of fiber being squeezed by the plates 24 and 25. In accordance with this invention, the applied polarization forces 22 and 23 are said to be equal in magnitude to the polarization forces applied along the force lines 26 and 27.

As a practical matter the $F_x$ and $F_y$ generally will comprise biasing or constant components ($F_{x0}$, $F_{y0}$) and zero mean, and time dependent components ($F_x(t)$, $F_y(t)$). Control is performed with equal changes in the time dependent forces about the biasing or constant forces. The biasing force will be selected such that the sum of the components will always have a positive value. That is, in use, the plates 20 and 21 and the plates 24 and 25 will always maintain the corresponding regions of the optical fiber 10 in compression.

As known, the composite i.e., superposition strain at the center of the optical fiber 10 is proportional to the forces applied to the optical fiber 10 by either the parallel plates 20 and 21 or the pair of parallel plates 24 and 25. This strain "$\hat{\epsilon}$" is given by $$\hat{\epsilon} = \begin{bmatrix} \frac{\Delta x}{x} \\ \frac{\Delta y}{y} \\ \frac{\Delta z}{z} \end{bmatrix} = \begin{bmatrix} \mu_1 & \mu_2 \\ \mu_2 & \mu_1 \\ \mu_3 & \mu_3 \end{bmatrix} \begin{bmatrix} \frac{F_x}{L} \\ \frac{F_y}{L} \end{bmatrix} = \begin{bmatrix} \epsilon_x \\ \epsilon_y \\ \epsilon_z \end{bmatrix} \quad (3)$$

where the constants "$\mu_1$", "$\mu_2$" and "$\mu_3$" are determined by mechanical properties of glass, the forces $F_x$ and $F_y$ are the polarization control forces shown in FIGS. 2 and 3 and each plate is assumed to have a length L along the optical fiber 10.

The resulting phase delay vector for "x" and "y" polarized light components is then given by:

$$\begin{bmatrix} \Phi_x \\ \Phi_y \end{bmatrix} = kL_0 n \begin{bmatrix} \frac{-n^2 p_{11}}{2}, & \frac{-n^2 p_{12}}{2}, & \left(1 - \frac{-n^2 p_{12}}{2}\right) \\ \frac{-n^2 p_{12}}{2}, & \frac{-n^2 p_{11}}{2}, & \left(1 - \frac{-n^2 p_{12}}{2}\right) \end{bmatrix} \hat{\epsilon} \quad (4)$$

where $p_{11}$ and $p_{12}$ are photo-elastic constants for the fiber material and n is its index of refraction.

Once the phase delays of the two axes have been calculated, the birefringence and average phase delay can be determined by:

$$\beta = \Phi_y - \Phi_x \quad (5)$$
$$= \frac{kL_0 n^3}{2}(p_{11} - p_{12})(\varepsilon_x - \varepsilon_y)$$
$$= \frac{kL_0 n^3}{2L}(p_{11} - p_{12})(\mu_1 - \mu_2)(F_y - F_x)$$

so that $$\beta = \frac{kL_0 n^3}{2L} * (p_{11} - p_{12}) * (\mu_1 - \mu_2) * (F_{y0} - F_{x0} + F_y(t) - F_x(t)) \quad (6)$$

As previously indicated, the polarization forces $F_x$ and $F_y$ are comprised of constant preload forces $F_{y0}$ and $F_{x0}$ and the zero mean, and time dependent forces $F_y(t)$ and $F_x(t)$. The total phase delay in this system "$\beta(t)$" is the sum of a static birefringent shift plus the controlled birefringence "$\beta$", that is:

$$\beta(t) = \beta_0 + \frac{kL_0 n^3}{2L}(p_{11} - p_{12})(\mu_1 - \mu_2)(F_y(t) - F_x(t)) \quad (7)$$

Equation (6) can then be reduced by defining the constant phase delay as:

$$\beta_0 = \frac{kL_0 n^3}{2L}(p_{11} - p_{12})(\mu_1 - \mu_2)(F_{y0} - F_{x0}) \quad (8)$$

and by defining the term "$\beta_1$" as:

$$\beta_1 = \frac{kL_0 n^3}{2L}(p_{11} - p_{12})(\mu_1 - \mu_2) \quad (9)$$

The reduced equation for $\beta(t)$ then becomes:

$$\beta(t) = \beta_0 + \beta_1(F_y(t) - F_x(t)) \quad (10)$$

As previously indicated in equation (2) the average phase shift can be determined by:

$$\Phi = \frac{(\Phi_y + \Phi_x)}{2} \quad (11)$$
$$= \frac{kL_0 \tilde{n}}{2L}\left[2\mu_3\left(1 - \frac{n^2 p_{12}}{2}\right) - \frac{n^2}{2}(p_{11} + p_{12})(\mu_1 + m_2)\right](F_y + F_x)$$

Using a similar analysis as previously used in connection with the phase delay, the average phase delay of equation (11) is defined by a constant "$\Phi_0$" and a variable delay, so that the total average phase delay can be given by:

$$\Phi(t) = \Phi_0 + \left[\frac{kL_0 n}{2L}\right] * \left[2\mu_3\left(1 - \frac{n^2 p_{12}}{2}\right) - \frac{n^2}{2}(p_{11} + p_{12})(\mu_1 + \mu_2)\right] * [(F_y(t) + F_x(t))] \quad (12)$$

Further reducing equation (12) yields:

$$\overline{\Phi}(t) = \Phi_0 + \Phi_1(F_y(t) + F_x(t)) \quad (13)$$

From this it will be apparent that the difference force control mode in equation (10) changes the birefringence and the sum force control mode in equation (13) changes the average phase. If the polarization control forces are related such that:

$$F_y(t) = F_c(t) = -F_x(t) \quad (14)$$

then the forces produce a birefringence without introducing a phase noise. Specifically, the equation (10) becomes $$\beta(t) = \beta_0 + 2\beta_1 F_c(t) \quad (15)$$

and equation (13) becomes $$\overline{\Phi}(t) = \Phi_0 \quad (16)$$

Thus once the biasing forces are applied in an out-of-phase relationship, the average phase change remains constant.

If, on the other hand, the control forces are related by:

$$F_y(t) = F_c(t) = F_x(t) \quad (17)$$

then the forces produce a phase change without introducing a birefringence and its concomitant polarization noise. Specifically equation (10) becomes $$\beta(t) = \beta_0 \quad (18)$$

while equation (13) becomes $$\overline{\Phi}(t) = \Phi_0 + 2\Phi_1 F_c(t) \quad (19)$$

Thus the biasing forces are applied with the resulting in-phase relationship, the average birefringence remains constant.

Apparatus may operate according to either of the foregoing analyses. FIG. 1 depicts a controller for varying polarization independently of phase delay. A signal generator 30 generates a time dependent voltage signal representing a desired modulating function for the light passing through the optical fiber 10. The signal has two components. A $V_0$ component is a constant signal that corresponds to the biasing forces mentioned above. A $V(t)$ component is the time varying or modulating function.

A phase control unit 31 in the controller 19 converts this signal into the $F_x$ and $F_y$ signals. The $F_x$ signals energize the transducers 15 and 17; the $F_y$ signals, energize the transducers 16 and 18. The phase control unit 31 generates the $F_x$ and $F_y$ signals to maintain the 180° phase relationship between the transducers 15 and 16 and between the transducers 17 and 18. In this mode the apparatus shown in FIG. 1 controls the polarization state of coherent light propagating through the optical fiber 10 without causing any large phase change or excess propagation delay.

Still referring to FIG. 1, this particular apparatus depicts four transducers 15, 16, 17 and 18 for applying forces to the optical fiber as previously described. Moreover as previously described the transducers 15 and 16 are affixed to a support (not shown) such that forces generated by the transducer 15 are applied orthogonally with respect to the forces applied by the transducer 16. Likewise the forces applied by the transducers 17 and 18 are orthogonal to each other. Moreover the second force cell 14 is rotated about the long axis with respect to the first force cell 13 such that the forces applied by the corresponding transducers of the first force cell 13 are at 45° with respect to the forces being applied by the force cell 14. The use of two or more force cells with these orientations enable smooth control of polarization.

FIG. 1 is an illustrative embodiment, however. The transducers can in fact be arranged in any order because the operation of these transducers follows the laws of superposition. Consequently it is only necessary that there be two transducers orthogonally disposed to each head assembly to define a single force cell and at least two force cells rotated by 45° with respect to each other.

Figure 4:
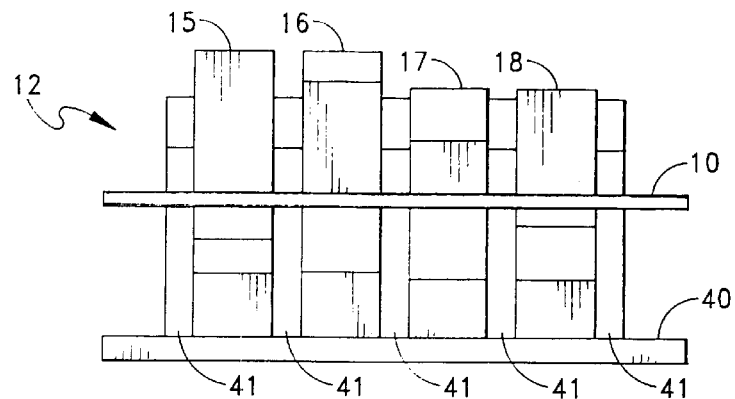
FIG. 4 is a side view of an apparatus for operating in accordance with this invention.

FIG. 4 is a side view of an apparatus that provides the function and an alternative construction to that shown in FIG. 1. More specifically, in FIG. 4 the polarization controller 12 includes a base plate 40 and a plurality of spaced parallel support plates 41 that are perpendicular to the base plate 40 and spaced by a distance corresponding to the thickness of each of the transducers 15, 16, 17 and 18. The optical fiber 10 passes through this assembly to be acted upon in accordance with the foregoing analysis such that the forces applied by the transducers 15 and 16 are 180° out-of-phase with each other and the forces applied by the transducers 17 and 18 are 180° out-of-phase with respect to each other. Furthermore the structures are shown such that the transducers 15 and 16 are at right angles with respect to a view along the axis of the optical fiber 10. Likewise the transducers 17 and 18 are at right angles to each other. Finally the transducers 15 and 17 are rotated 45° with respect to each other, again all as previously described in FIG. 1.

Figure 5:
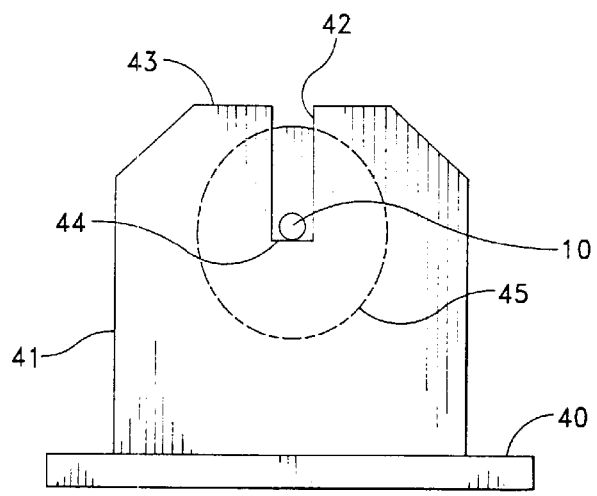
FIG. 5 is an end view of a support included in the apparatus of FIG. 4.

FIG. 5 depicts the base plate 40 and a single support plate 41. The support plate 41 contains a slot 42 extending from a top surface 43 of the support plate 41 to a bottom surface 44 that is positioned vertically to define a support plane through the polarization controller 12 for the optical fiber 10. A circle 45 represents a bolt hole circle by which the individual transducers 15 through 18 are secured between their respective support plates 41. The transducers 15 through 18 can be individually connected to the support plates. Alternatively, if an even number of bolt holes are preformed in the support plates, then the entire assembly can be through bolted which will allow for predetermined orientations of the individual transducers 15 through 18. For example, if eight bolt holes are placed on the circle 45, then 45° relative spacing about the circle 45 can be achieved with the use of through bolts.

Figure 6:
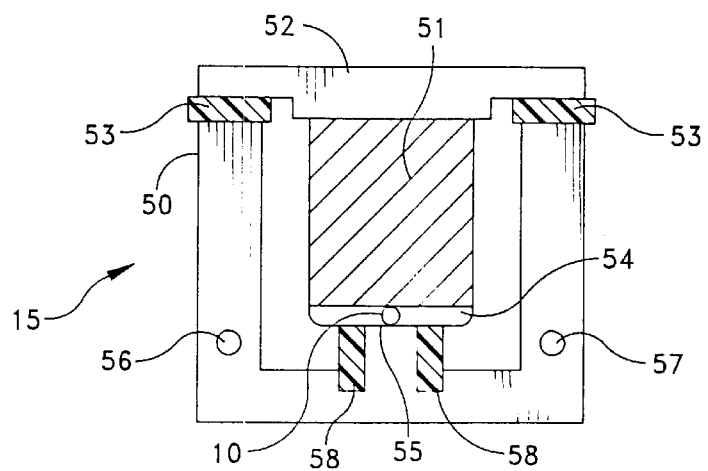
FIG. 6 a detailed view of a transducer included in the apparatus of FIG. 4.

FIG. 6 depicts a detailed view of the transducer 15; each of the other transducers 16 through 18 has an identical construction. More specifically, as shown in FIG. 6 the transducer includes a support frame 50 and a transducer 51. A terfenal-D transducer is an example of a solenoid-acting transducer that precisely applies forces in proportion to an electrical signal energizing a coil contained in the transducer. A backing plate 52 mounted through elastomeric dampers 53 to the support frame 50 positions the transducer 51 such that its piston 54 is spaced from a backing surface 55. The backing surface 55 is raised slightly above the inner base of the support frame 40 and matches the position of bolt holes 56 and 57 that would receive bolts from the support frames 41. The alignment between the piston 54 and the backing surface 55 allows the optical fiber 10 (as shown in FIG. 3) to pass through the polarization control apparatus without being bent. Elastomeric springs 58 align the piston 54 so the force applied to the optical fiber 10 is perpendicular to the backing surface 55.

As previously indicated, the piston 54 remains in contact with the optical fiber 10 during static conditions by virtue of the biasing force (i.e., the corresponding $F_{x0}$ or $F_{y0}$ force of equation (6)). When polarization change is desired, the magnitude of the force applied by the piston 54 to the optical fiber 10 is altered in accordance with the corresponding control sequence.

Figure 7:
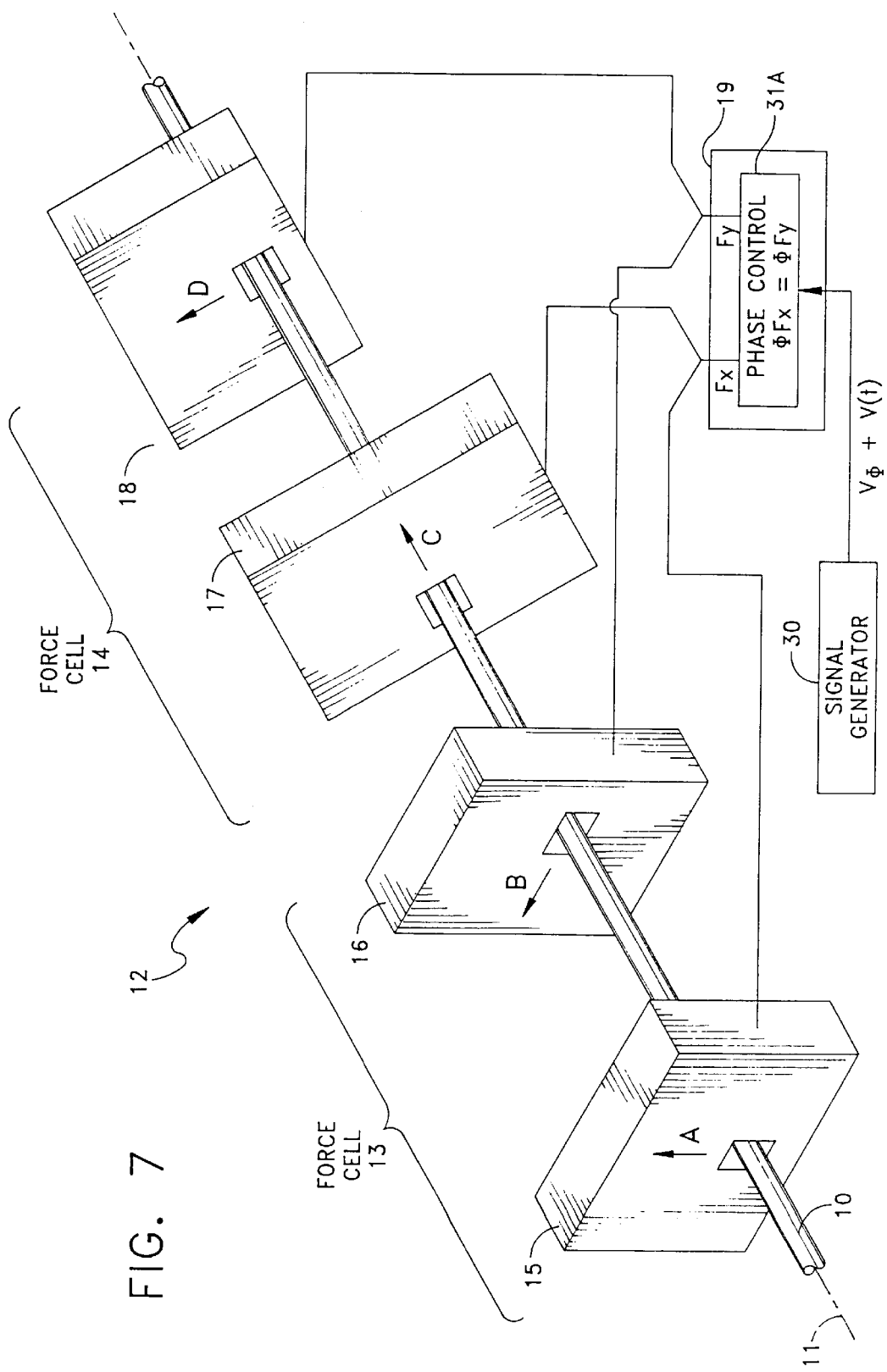
FIG. 7 a alternative embodiment of the apparatus of FIG. 1 for varying the phase delay of light transmitted through an optical fiber.

The embodiment of FIG. 7 enables a time varying voltage to control the phase delay without any substantial change in polarization. The phase of the signal applied to the transducers 15 and 17 is in-phase with the signals applied to the transducers 16 and 18 respectively. In FIG. 7, the signal generator 30 generates a time dependent voltage signal representing a desired modulating function for the light passing through the optical fiber 10. Like the signal generator in FIG. 1, the signal has two components. A $V_0$ component is a constant signal that corresponds to the biasing forces mentioned above. A V(t) component is the time varying or modulating function.

A phase control unit 31A in the controller 19 converts this signal into the $F_x$ and $F_y$ signals. The $F_x$ signals energize the transducers 15 and 17; the $F_y$ signals, the transducers 16 and 18. The phase control unit 31 generates the $F_x$ and $F_y$ signals to maintain the 0° phase or in-phase relationship between the transducers 15 and 16 and between the transducers 17 and 18. In this mode the apparatus shown in FIG. 1 controls the phase delay of coherent light propagating through the optical fiber 10 without causing any large change in polarization state.

As in FIG. 1, the apparatus of FIG. 7 includes four transducers 15, 16, 17 and 18 for applying forces to the optical fiber as previously described. Moreover as previously described the transducers 15 and 16 are affixed to a support (not shown) such that forces generated by the transducer 15 are applied orthogonally with respect to the forces applied by the transducer 16. Likewise the forces applied by the transducers 17 and 18 are orthogonal to each other. Moreover the second force cell 14 is rotated about the long axis with respect to the first force cell 13 such that the forces applied by the corresponding transducers of the first force cell 13 are at 45° with respect to the forces being applied by the force cell 14. The use of two or more force cells with these orientations enable smooth control of phase delay.

Thus in accordance with the objectives of this invention there has been disclosed a method and apparatus for enabling the control of polarization independently of phase delay and a method and apparatus for enabling the control of phase delay independently of polarization. The invention has been described in terms of a theory of operation and specific embodiments that depicts spaced cells around a conventional optical fiber. Spacing the individual transducers along the optical fiber represents a typical apparatus. However, as previously indicated, the system operates according to the laws of superposition so that it could be possible in a particular application, primarily determined by the size of the optical fiber, to apply the forces from two transducers at a single location along the length of the optical fiber.

Although the invention has been described in terms of optical fibers that are typically glass fibers, it can also be implemented using glass or silicon rods. Moreover this invention is applicable to a wider group of materials applicable to other isotropic materials. The difference between silicon and other isotropic materials lies in the photo-elastic constants and mechanical properties of the material. These will change the strength of the birefringence produced when the transducers apply the various forces. The analysis presented to the particularly disclosed embodiment must be altered for non-isotropic birefringent materials but such variations are well within the capabilities of persons of ordinary skill in the art. Moreover the optical fiber can include round, square or rectangular rods of birefringent material and may incorporate bolt optic applications also. It will be apparent that many other modifications can be made to the disclosed apparatus without departing from the invention. Therefore, it is the intent of the appended claims to cover all such variations and modifications as come within the true spirit and scope of this invention.

What is claimed is:

1. A method for controlling the characteristic of one of a pair of normally interdependent characteristics of light in an optical fiber in response to a time dependent variable signal without any significant variation of the other characteristic, said method comprising the steps of:

defining first and second locations on an optical fiber for compressing the optical fiber under the influence of first and second pairs of opposed forces;

directing the forces in a pair along a force axis, the force axes at the first and second locations being in parallel planes orthogonal to the optical fiber axis and being angularly displaced; and maintaining a constant phase relationship between the forces at the first and second locations and the time dependent signal whereby variations in the forces applied at the first and second locations alter the one interdependent characteristic of light passing the first and second locations in accordance with the time dependent signal without any significant variation in the other characteristic.

2. A method as recited in claim 1 wherein the force axes for the first and second pairs of opposed forces are displaced by about 90°.

3. A method as recited in claim 1 wherein the application of forces includes the application of the first and second pairs of opposed forces at each of a plurality of positions along the optical fiber.

4. A method as recited in claim 3 wherein at each of the plurality of positions, the force axes of the first and second pairs of opposed forces at each location are displaced by about 90°.

5. A method for controlling the polarization of light in an optical fiber in response to a time dependent variable signal without any signification variation in the normally interdependent characteristic of phase delay, said method comprising the steps of:

defining first and second locations on an optical fiber for compressing the optical fiber under the influence of first and second pairs of opposed forces;

directing the forces in a pair along a force axis, the force axes at the first and second locations being in parallel planes orthogonal to the optical fiber axis and being angularly displaced; and maintaining an out-of phase relationship between the forces at the first and second locations and the time dependent signal whereby variations in the forces applied at the first and second locations alter the polarization of light passing the first and second locations in accordance with the time dependent signal without introducing any significant variation in phase delay.

6. A method as recited in claim 5 wherein the force axes for the first and second pairs of opposed forces are displaced by about 90° and the first and second pairs of opposed forces are applied with a phase difference of about 180°.

7. A method as recited in claim 5 wherein at each of the plurality of positions, the force axes of the first and second pairs of opposed forces at each location are displaced by about 90° and the first and second pairs of opposed forces are applied with a phase difference of about 180°.

8. A method as recited in claim 7 wherein the application of forces includes the application of the first and second pairs of opposed forces at each of a five positions along the optical fiber.

9. A method for controlling the phase delay of light in an optical fiber in response to a time dependent variable signal without any signification variation in the normally interdependent characteristic of polarization, said method comprising the steps of:

defining first and second locations on an optical fiber for compressing the optical fiber under the influence of first and second pairs of opposed forces;

directing the forces in a pair along a force axis, the force axes at the first and second locations being in parallel planes orthogonal to the optical fiber axis and being angularly displaced; and maintaining an in-phase relationship between the forces at the first and second locations and the time dependent signal whereby variations in the forces applied at the first and second locations alter the phase delay of light passing the first and second locations in accordance with the time dependent signal without introducing any significant variation in polarization.

10. A method as recited in claim 9 wherein the force axes for the first and second pairs of opposed forces are displaced by about 90° and the first and second pairs of opposed forces are applied with a phase difference of about 0°.

11. A method as recited in claim 9 wherein the application of forces includes the application of the first and second pairs of opposed forces at each of a plurality of positions along the optical fiber.

12. A method as recited in claim 11 wherein at each of the plurality of positions, the force axes of the first and second pairs of opposed forces at each location are displaced by about 90° and the first and second pairs of opposed forces are applied with a phase difference of about 0°.

13. Apparatus for controlling the characteristic of one of a pair of normally interdependent characteristics of light in an optical fiber in response to a time dependent variable signal without any significant variation of the other characteristic, said apparatus comprising:

first and second transducers at spaced locations on an optical fiber, each transducer compressing the optical fiber by applying a pair of opposed forces along a force axis, the force axes of said first and second transducers being in parallel planes orthogonal to the optical fiber axis and being angularly displaced; and control means for energizing each of said first and second transducers with the maintenance of a constant phase relationship between the forces applied by each of said first and second transducers and the time dependent signal whereby said first and second transducers collectively alter the one interdependent characteristic of light passing said first and second transducers in accordance with the time dependent signal without any significant variation in the other characteristic.

14. Apparatus as recited in claim 13 wherein the force axes for said first and second transducers are displaced by about 90°.

15. Apparatus as recited in claim 13 wherein said first and second transducers constitute a transducer set, said apparatus comprising at least one additional transducer set whereby said apparatus comprises a plurality of transducer sets spaced along the optical fiber and wherein said control means maintains the same phase relationship between said first and second transducers in each of said transducer sets.

16. Apparatus for controlling the polarization of light in an optical fiber in response to a time dependent variable signal without any signification variation in the normally interdependent characteristic of phase delay, said apparatus comprising:

first and second transducers at spaced locations on an optical fiber, each transducer compressing the optical fiber by applying a pair of opposed forces along a force axis, the force axes of said first and second transducers being in parallel planes orthogonal to the optical fiber axis and being angularly displaced; and control means for energizing each of said first and second transducers in response to the time dependent signal with the phase of energization of said first transducer being out of phase with the energization of said second transducer whereby said first and second transducers collectively alter the polarization of light passing said first and second transducers in accordance with the time dependent signal without any significant variation in phase delay.

17. Apparatus as recited in claim 16 wherein the force axes for said first and second transducers are displaced by about 90° and the phase difference between the energization of the first and second transducers is about 180°.

18. Apparatus as recited in claim 16 wherein said first and second transducers constitute a transducer set, said apparatus comprising at least one additional transducer set whereby said apparatus comprises a plurality of transducer sets spaced along the optical fiber and wherein said control means maintains the same phase relationship between said first and second transducers in each of said transducer sets.

19. Apparatus as recited in claim 18 wherein said first and second transducers in each of said transducer sets are angularly displaced by about 90° and the phase difference between the energization of the first and second transducers is about 180°.

20. Apparatus as recited in claim 19 wherein said each of said first transducers in a transducer set is angularly displaced with respect to said first transducer in any adjoining transducer set.

21. Apparatus as recited in claim 19 wherein said plurality of transducer sets is five.

22. Apparatus as recited in claim 21 wherein each of said first transducers in a transducer set is angularly displaced with respect to said first transducer in any adjoining transducer.

23. Apparatus as recited in claim 22 wherein the force axes for said first and second transducers are displaced by about 90° and the phase difference between the energization of the first and second transducers is about 0°.

24. Apparatus as recited in claim 21 wherein each of said first transducers in a transducer set is angularly displaced with respect to said first transducer in any adjoining transducer by about 45° with respect to said first transducer in an adjoining transducer set.

25. Apparatus as recited in claim 24 wherein said control means includes means for generating a constant signal that is summed with the time dependent signal whereby said first and second transducers compress the optical fiber for all values of the time dependent signal.

* * * * *